Figure 1:
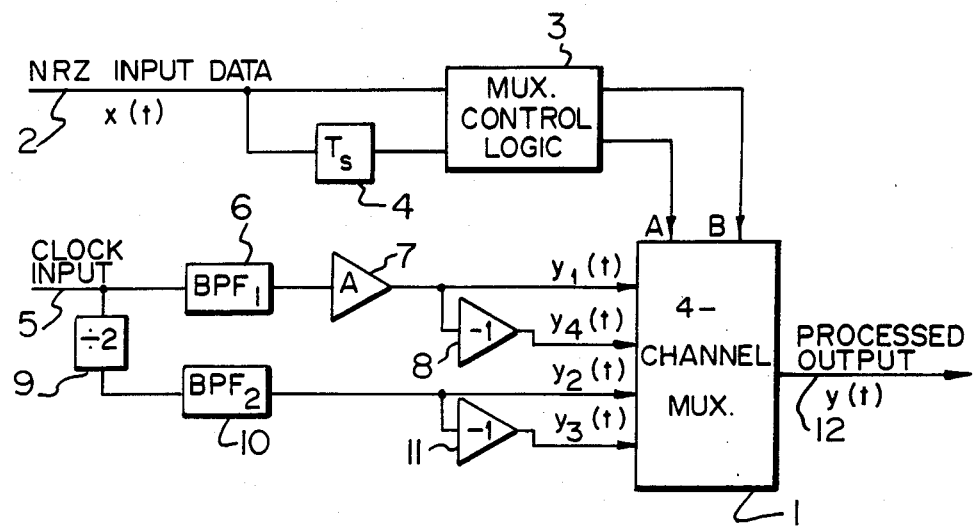

United States Patent [19]

Seo et al.

[11] Patent Number: 4,644,565
[45] Date of Patent: Feb. 17, 1987

[54] SUPERPOSED QUADRATURE MODULATED BASEBAND SIGNAL PROCESSOR

[75] Inventors: Jongsoo Seo; Kamilo Feher, both of Ottawa, Canada

[73] Assignee: Canadian Patents and Development Limited-Societe Canadienne des Brevets et d'Exploitation Limitee, Ottawa, Canada

[21] Appl. No.: 619,740

[22] Filed: Jun. 12, 1984

[51] Int. Cl.$^4$ ............................................. H04B 15/00
[52] U.S. Cl. ........................................ 375/60; 375/39; 375/61; 332/37 R
[58] Field of Search ................... 375/18, 37, 38, 39, 375/43, 60, 58, 56, 84, 85; 364/718, 721; 360/45; 178/69 N; 307/260, 261; 328/27, 34; 343/17.1 R; 332/9 R, 37 R, 10

[56] References Cited

U.S. PATENT DOCUMENTS

| | | | |
|---|---|---|---|
| 3,048,784 | 8/1962 | Scherer | 375/37 |
| 3,377,625 | 4/1968 | Filipowsky | 375/37 |
| 3,605,017 | 9/1971 | Chertok et al. | 375/43 |
| 3,634,773 | 1/1972 | Kobayashi | 375/43 |
| 4,159,526 | 6/1979 | Mosley, Jr. et al. | 364/721 |
| 4,176,248 | 11/1979 | Sheets | 375/17 |
| 4,261,053 | 4/1981 | Dostis et al. | 375/60 |

Primary Examiner—Benedict V. Safourek
Attorney, Agent, or Firm—Pascal & Associates

[57] ABSTRACT

A signal processor for providing a continuous raised cosine output signal having no jitter or intersymbol-interference and with controllable main and side lobes. An NRZ input signal is converted to a double interval raised cosine pulse signal having an amplitude normalized to 1.0. Another single interval raised cosine pulse signal having a peak amplitude $(A-1)$ is superposed with the former raised cosine pulse to provide the output signal.

20 Claims, 12 Drawing Figures

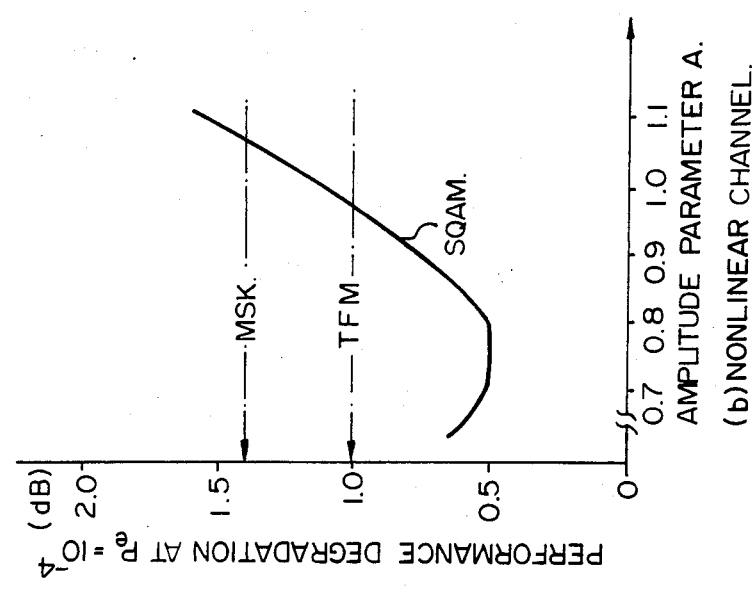
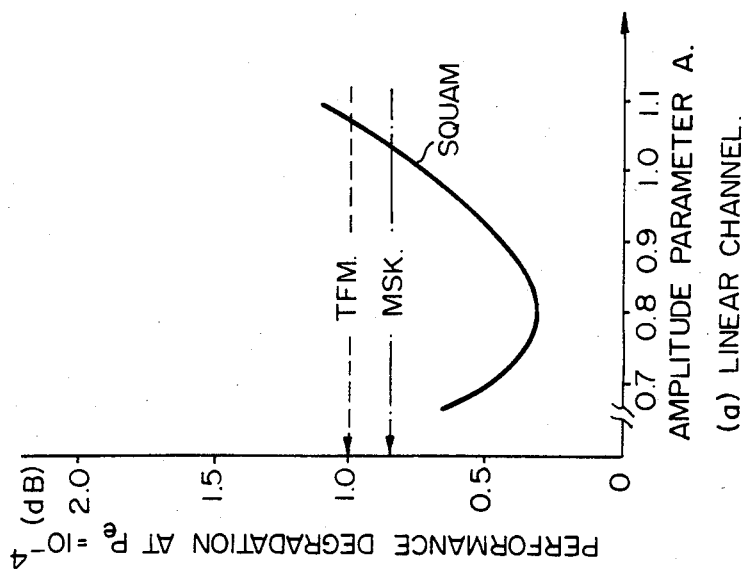

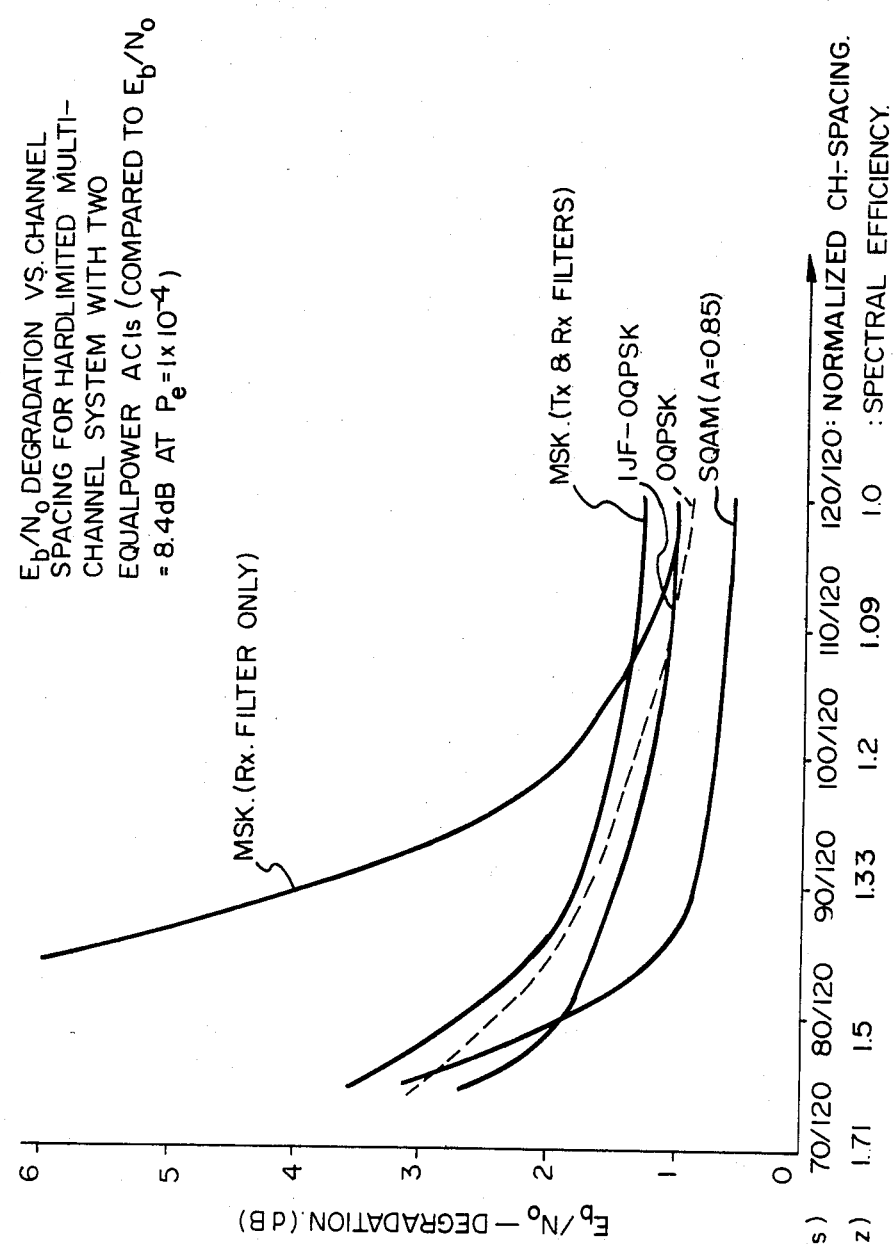

SUPERPOSED QUADRATURE MODULATED BASEBAND SIGNAL PROCESSOR

This invention relates to a signal processor for digital systems, and particularly to a processor useful in linear or non-linear satellite transmission systems, earth-bound microwave links, mobile radio systems and other modulated system applications.

Binary data signals, usually NRZ (non-return to zero) types of signals, are modulated on a single carrier or on quadrature carrier signals for transmission to a satellite or microwave receiver. A last stage prior to transmission is high powered amplification in a HPA. Efficient operation of the high powered amplifier requires it to be operated in its saturated mode, which causes it to be non-linear, resulting in the creation of numerous sidebands, usually causing interchannel interference.

Quadrature phase-shift-keyed (QPSK) or conventional quadrature shifted amplitude modulated (QAM) modulation techniques are widely used in such digital transmission systems because they can be implemented using simple hardware, and because of good spectral efficiency, in a linear channel. However when a QPSK signal is band-limited and then amplified by a saturated HPA, spectral side lobes at the output of HPA regrow due to the non-linear amplification in the HPA. The regrown side lobes cause significant interference into adjacent channels, and bit error rate performance degrades. Therefore for many power efficient (i.e. saturated HPA) and spectral efficient applications, QPSK is not a very attractive modulation technique.

To achieve higher power and spectral efficiency in digital transmission systems, the power spectrum of the non-linearly amplified signal should have a narrow main lobe and a fast spectral roll-off. To achieve better probability of error performance, timing jitter and intersymbol-interference of the received signal should be minimized.

Further, as applications of digital communications become widely diversified, flexible system designs for the different channel conditions (i.e., linear or nonlinear channel, single or multiple channel and variable bit rate) are required.

Consequently the output signals must be filtered. In U.S. Pat. No. 4,339,724 issued July 13th, 1982, an invention made by Kamilo Feher is described in which a baseband filter is realized in which the comparison of an output signal with the input NRZ signal one bit at a time results in output signals being "1's" or "0's", in a continuous form, joined by portions of sinewaves. This resulted in very efficient band-limited signal output by the saturated HPA, with substantially reduced inter-channel interference.

In an invention described in U.S. patent application Ser. No. 503,574, filed June 13, 1983, and now U.S. Pat. No. 4,567,602 invented by Dr. Shuzo Kato and Dr. Kamilo Feher, a cross-correlated baseband signal processor is described for processing an NRZ input signal by providing in-phase quadrature and phase shifted NRZ signals resulting from an input signal, cross-correlating the in-phase and quadrature shifted signals and generating in-phase and quadrature shifted IJF encoded output signals having amplitudes such that the vector sum of the modulated output signals is approximately the same in virtually all phases of each bit period. This resulted in a cross-correlated modulated signal having low envelope fluctuation, a controlled spectrum and limited side lobes. The modulated signals can be processed and applied to a high power output amplifier operated in its saturated mode for amplification and transmission to an antenna, with minimum interchannel interference, and controllable and reduced envelope fluctuation.

The present invention is believed to be a substantial improvement over the aforenoted inventions. It has been found that by the use of the present invention better $P_e$ performance is achieved than other well known constant envelope modulation schemes, shows less spectral spreading than conventional QPSK, OQPSK and MSK signals, is substantially jitter and intersymbol-interference free, and provides the ability to control the bandwidth of the main lobe as well as the side lobe roll-off by the variation of a signal amplitude parameter.

In general the present invention is a signal processor comprising apparatus for converting an NRZ input signal to a double interval raised cosine pulse having an amplitude normalized to 1.0, combined with an apparatus for superposing another single interval raised cosine pulse having a peak amplitude $(A-1)$ with the former raised cosine pulse to provide a continuous superposed (modified) raised cosine output signal having substantially no jitter or intersymbol-interference and with controllable main and side lobes.

In accordance with a preferred embodiment of the invention, each two consecutive input data (NRZ) bits are detected, and a multiplexer is enabled to apply one of four predetermined signals to the transmission system to form a continuous baseband signal. For a $-1,-1$ input data pattern, a negative DC biased cosine function, i.e. $y_1 = -A - (1-A) \cos 2\pi t/T$ is transmitted; for a $1,-1$ input data pattern, a negative cosine function, i.e. $y_2 = -\cos (\pi t/T)$ is transmitted; for a $-1,1$ input, a positive cosine function, i.e., $y_3 = \cos (\pi t/T)$ is transmitted; and for a $1,1$ input data pattern, a positive dc biased cosine function, i.e. $y_4 = A + (1-A) \cos (2\pi t/T)$ is transmitted. A is the amplitude parameter of the signal processor and T is the input data symbol duration. The transmitted signals have the same peak levels in all cases.

At least for the lower speed applications, the above can be realized by generating the functions in cosine generators, modifying the output of one of the cosine generators by passing its output through an amplifier having amplification factor A and by inverting the resulting output as well as the output of the other cosine generator, thereby to form the four functions $y_1$, $y_2$, $y_3$ and $y_4$ noted above. As will be described further below, the factor A can be used to control both the bandwidth of the main lobe and the roll-off of the side lobes, the amplitude of the side lobes will be substantially lower than those of the unprocessed NRZ signal.

Other alternative techniques to generate the baseband signal referred to above include double-interval pulse overlapping and binary transversal filtering.

Structure to realize the above has been found to be relatively simple, and thereby inexpensive, and therefore is believed to be useful in numerous satellite and terrestrial system applications.

Figure 2A:
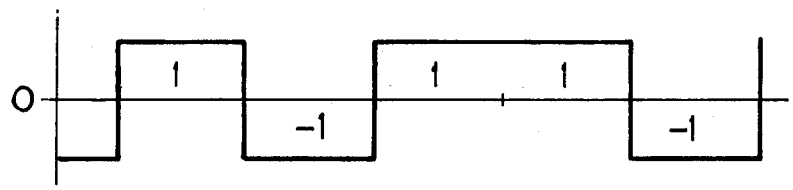
Figure 2B:
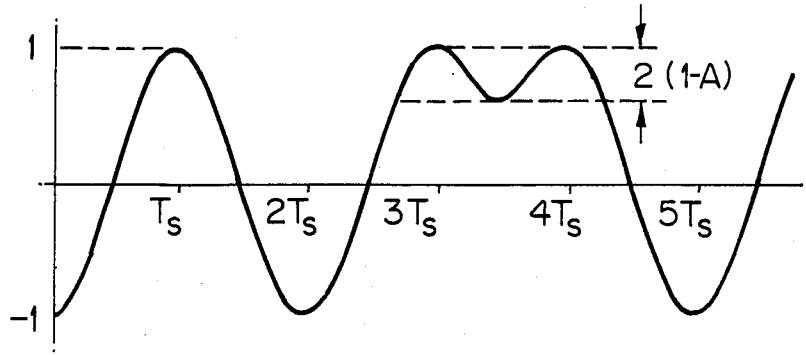
Figure 3:
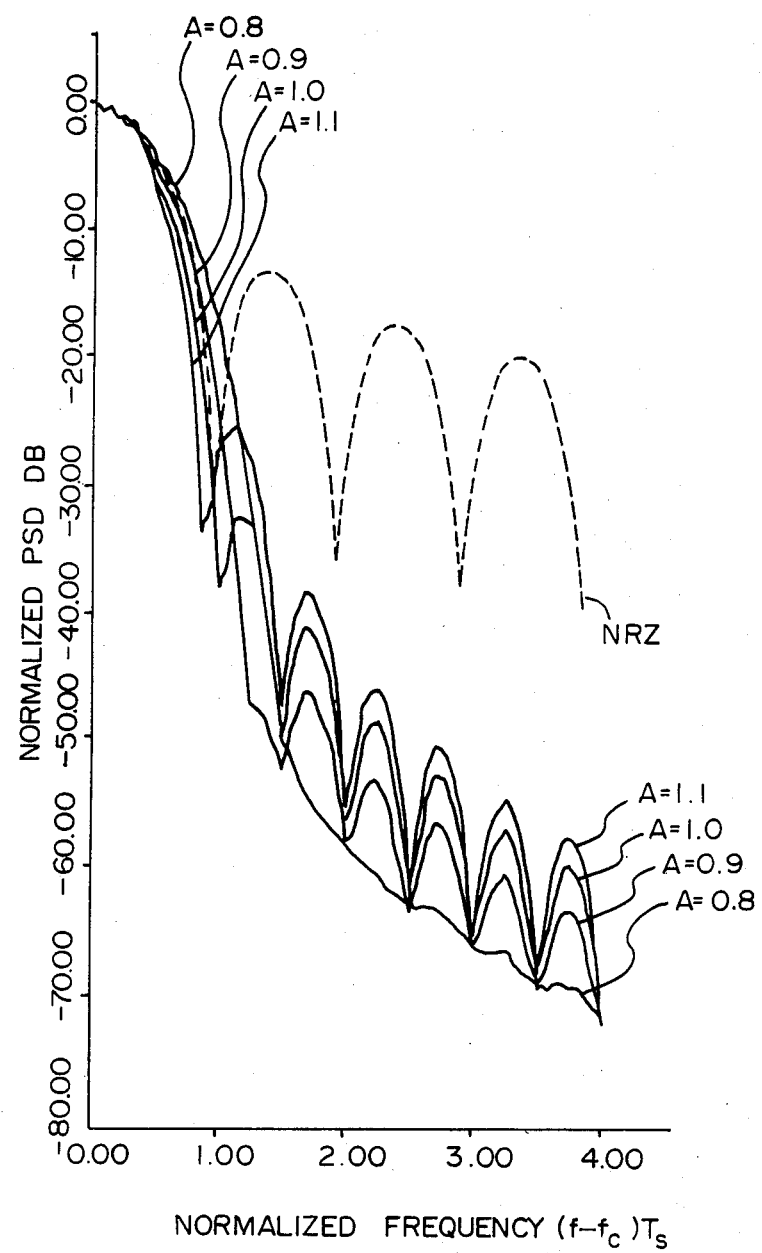
Figure 4A:
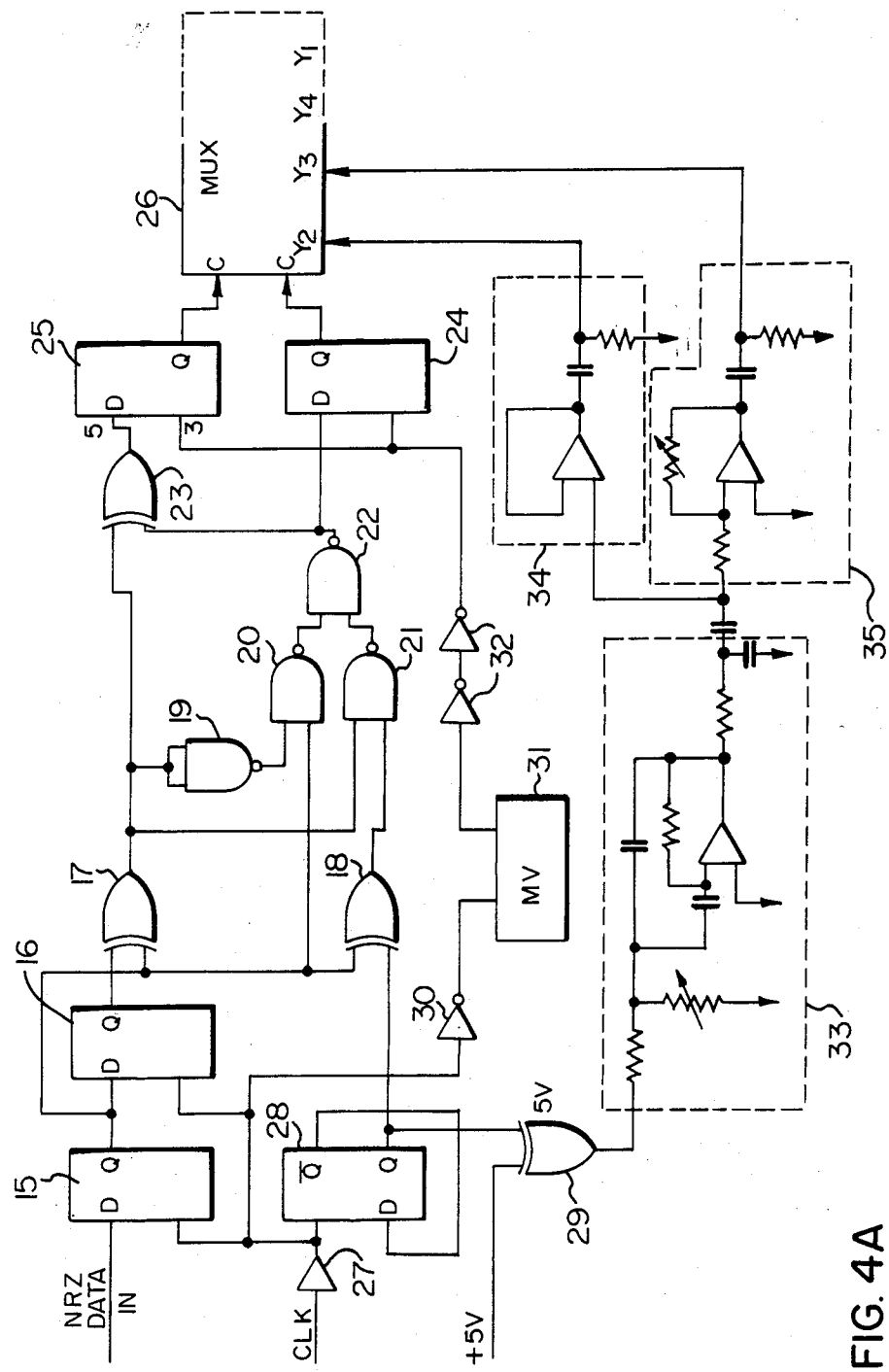
Figure 4B:
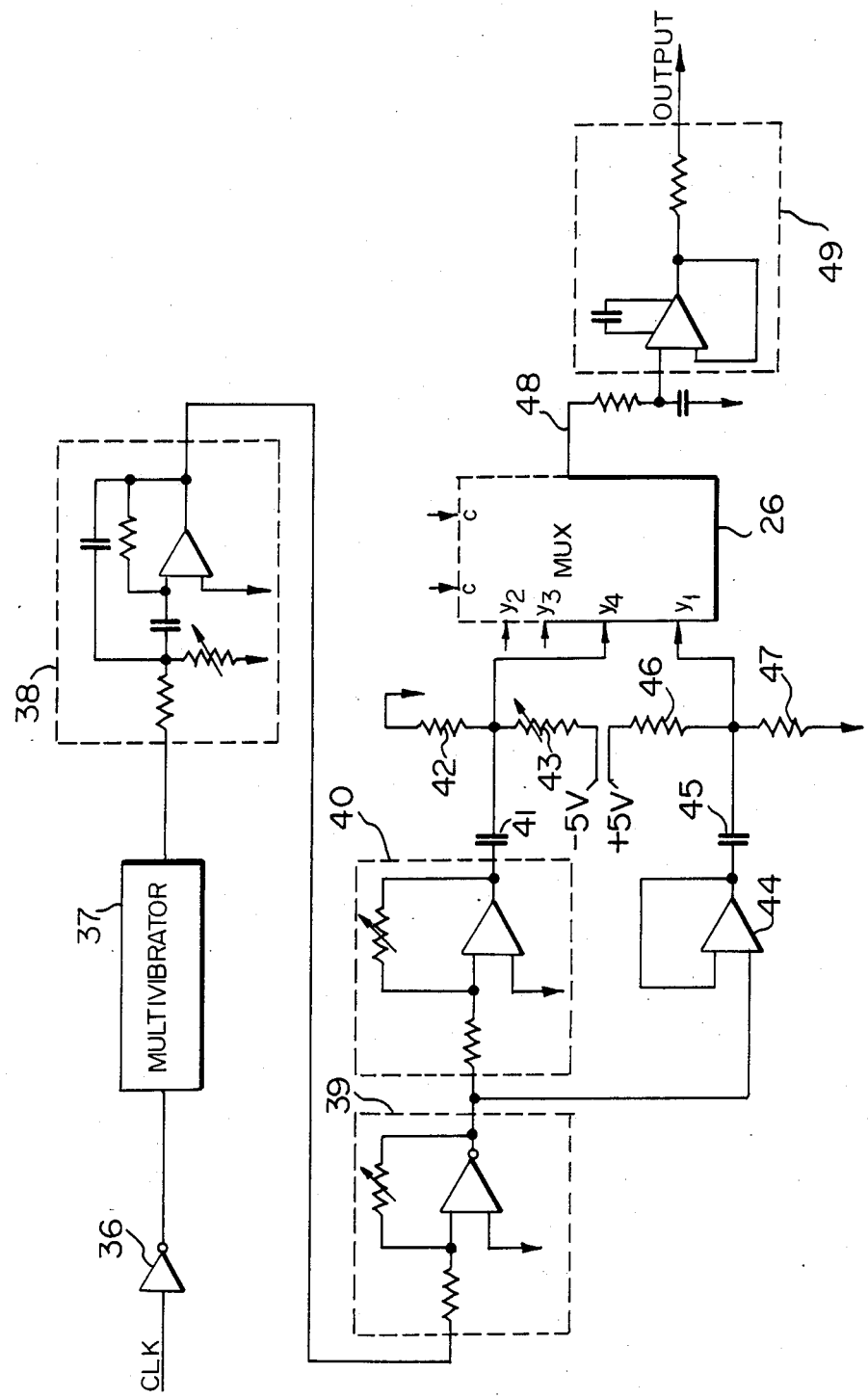
Figure 5:
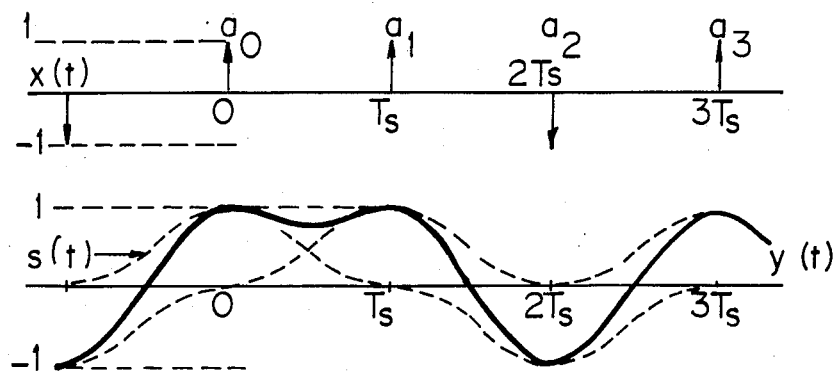

A better understanding of the invention may be obtained by reference to the detailed description below, and to the following drawings, in which:

FIG. 1 is a general block diagram of a relatively low speed embodiment of the invention, FIG. 2A is a representation of an input NRZ signal, FIG. 2B is a processed baseband signal waveform resulting from the NRZ signal, FIG. 3 is a graph of the power spectrum of the unprocessed NRZ signal and the processed baseband signal, FIGS. 4A and 4B show a detailed circuit diagram of an embodiment of the invention, FIG. 5 is a graph illustrating how the present invention can encode an NRZ signal using pulse overlapping, FIGS. 6A and 6B are graphs which compare performance degradation of the present invention with MSK and TFM systems in a linear and non-linear channel respectively.

Figure 9:
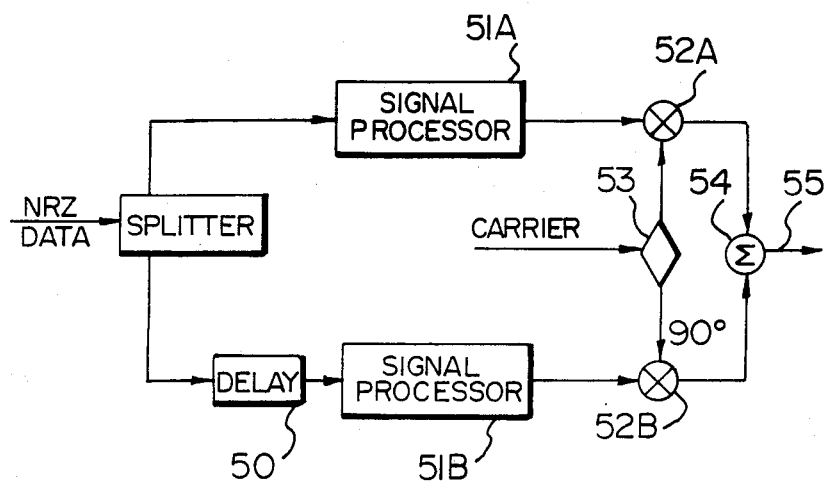
Figure 8:
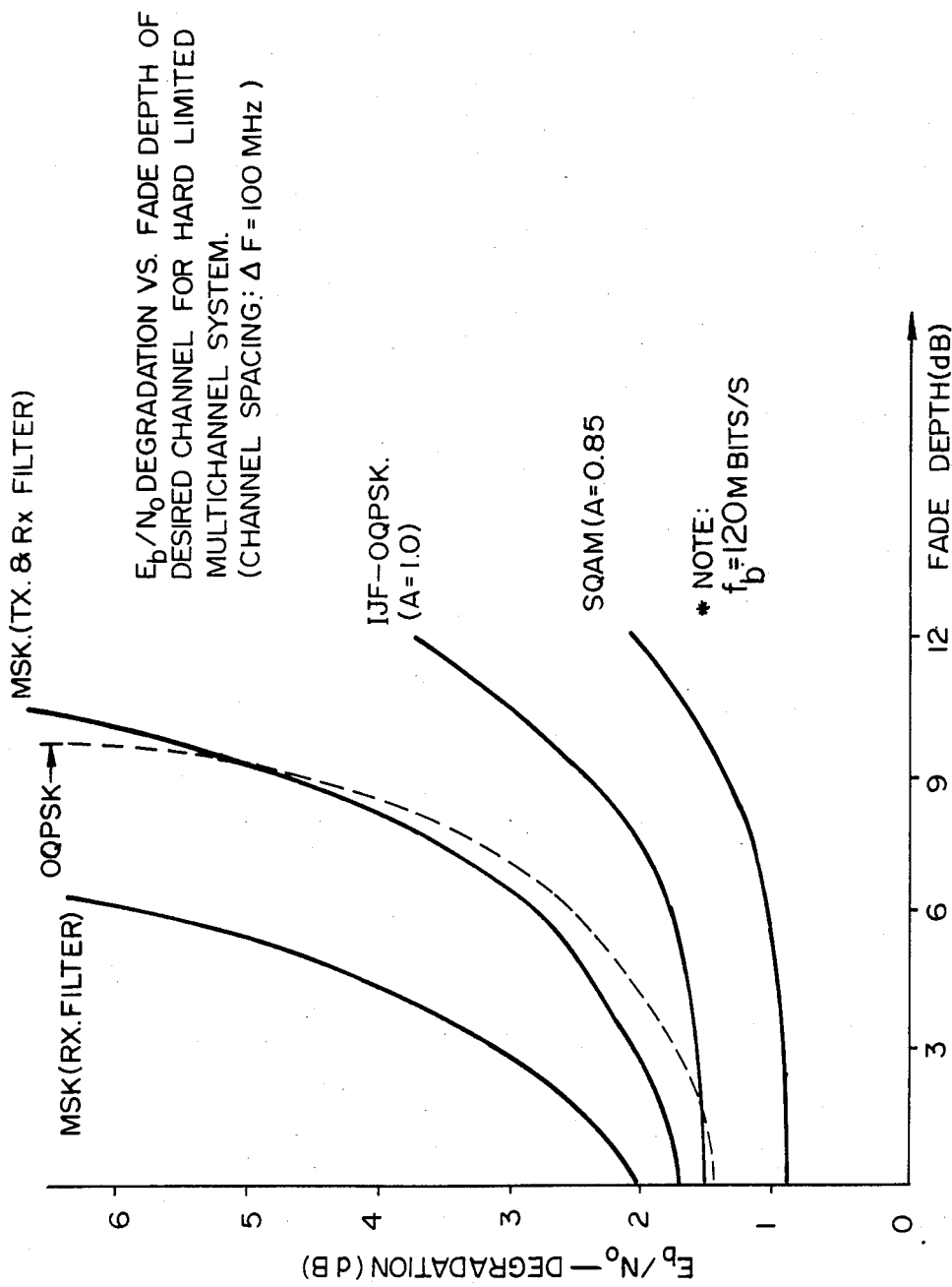

FIG. 7 is a graph illustrating performance degradation vs channel spacing for a hard-limited multichannel system comparing the present invention with other kinds of systems, FIG. 8 is a graph illustrating a comparison of degradation vs fade depth of a channel for hard limited multichannel systems, comparing the present invention with the other kinds of systems, and FIG. 9 is a block diagram of a modulator using signal processors according to this invention.

Turning to FIG. 1, a block diagram of the preferred form of the invention is shown. A four channel multiplexer 1 is shown having a pair of control inputs A and B. NRZ input data (e.g. as shown in FIG. 2A is carried by transmission path 2 to a multiplexer control logic circuit 3. The NRZ input data is also applied to a one bit delay circuit 4, which has its output connected to the multiplexer control logic circuit 3. Two output ports of multiplexer control logic are respectively connected to control inputs A and B of multiplexer 1. Signals at control inputs A and B select which signal input to the multiplexer to connect to its output.

A clock signal having the same pulse rate as the NRZ input data, is applied via transmission path 5 to the input of a bandpass filter 6. Bandpass filter 6 generates cosine functions from the clock signal. This signal is applied via amplifier 7 to one of four inputs of the multiplexer 1 labelled $y_1(t)$.

The output of amplifier 7 is also connected to an inverter 8, which has its output connected to the input of multiplexer 1 labelled $y_4(t)$.

The clock signal also applied through divide-by-two circuit 9 to the input of bandpass filter 10, which generates cosine functions from the clock signal. These cosine functions have a period twice the period of $Y_1(t)$ and $Y_4(t)$. The output of bandpass filter 10 is connected to the input of multiplexer 1 labelled $y_2(t)$. The output of bandpass filter 10 is also connected via inverter 11 to the input of multiplexer 1, labelled $y_3(t)$.

With the clock input applied to transmission path 5, the resulting signal at the multiplexer input $y_1(t)$ is $-A-(1-A)\cos(2\pi t/T)$. The signal appearing at input $y_4(t)$ is the inverse of the above, i.e. $A+(1-A)\cos(2\pi t/T)$. The signal applied to input $y_2(t)$ is $-\cos(\pi t/T)$, and the signal applied to input $y_3(T)$ is the inverse of the latter signal, i.e. $\cos(\pi t/T)$.

The multiplexer control logic provides the required switching functions to the multiplexer to switch any of the four signal inputs of the multiplexer to its output port 12. Since the multiplexer control logic receives at its inputs the NRZ input data and the NRZ input data delayed by one binary pulse, the control logic causes the following four signals to be switched to the output port 12 as follows:

(a) If the input NRZ data changes its state from 1 to −1, a negative-going portion of cosine function is switched to the output;

(b) If the input data changes its state from −1 to 1, a positive-going portion of cosine function is switched to the output;

(c) If the input data maintains its state as 1 and 1, a positive dc biased cosine function is switched to the output;

(d) If the input data keeps its state as −1 and −1, a negative dc biased cosine function is switched to the output.

With an input NRZ signal represented as in FIG. 2A, an output signal as shown in FIG. 2B is produced.

In order to control the width of the main spectral lobe, and the amplitude of the sidebands of a quadrature modulated carrier or offset modulated carrier by the aforenoted output signal, the gain value A, which can be produced in amplifier 7, is most important. Power spectra of an NRZ signal and of a signal processed according to the present invention, with various values of the gain value A, are shown in the power spectrum graph of FIG. 3. The values of A are referenced on the graph. Clearly the sidebands of the processed signals are both considerably lower than those of the NRZ signal, and are controllable, as is the bandwidth of the main lobe. Depending on the particular system requirement, desirable signals can be selected based on a tradeoff between the main lobe bandwidth and side lobe roll-off. It should also be noted that the output signal obtained shows no jitter and no intersymbol interference. The advantages of the present invention thus become very evident.

A detailed circuit diagram of the invention is shown in FIGS. 4A and 4B. The NRZ data signal is applied to the D input of a flip-flop 15, which has its Q output connected to the D input of a flip-flop 16. The Q output of flip-flop 16 is connected to one input of an exclusive OR circuit 17. The Q output of flip-flop 15 is also connected to the second input of exclusive OR circuit 17 and to one input of exclusive OR circuit 18. The output of exclusive OR circuit 17 is connected to both inputs of NAND gate 19 (operating as an inverter), which has its output connected to one input of NAND gate 20. The Q output of flip-flop 15 is also connected to the second input of NAND gate 20. The output of exclusive OR gate 17 is connected to one input of NAND gate 21; the output of exclusive OR circuit 18 is connected to the second input of NAND gate 21. The outputs of NAND gates 19 and 21 are connected to respective inputs of NAND gate 22, which has its output connected both to one input of exclusive OR gate 23 and to the D input of flip-flop 24. The output of exclusive OR gate 17 is also connected to the second input of exclusive OR gate 23, which has its output connected to the D input of flip-flop 25. The Q outputs of flip-flops 24 and 25 are connected to control inputs C of four channel multiplexer 26.

A clock signal which has the same pulse rate as the NRZ input data is passed in inverter 27, and is applied to the clock inputs of flip-flops 28, 15 and 16. The $\overline{Q}$ input of flip-flop 28 is connected back to its D input. The Q output of flip-flop 28 is connected to the second input of exclusive OR gate 18, and to one input of exclusive OR gate 29. The second input of exclusive OR gate 29 is connected to a source of positive potential, e.g. +5 V.

The inverted clock signal is inverted to the original polarity by passing through inverter 30 and is applied to one input of monostable multivibrator 31. This multivibrator compensates for the time delay caused by the processing of the NRZ data through elements 15–25. The output of monostable multivibrator 31 is applied to the clock inputs of flip-flops 24 and 25 through buffer 32. The Q outputs of flip-flops 24 and 25 provide two bit control signals to the four channel multiplexer 26.

It will be seen that flip-flop 16 provides a further one bit delay for NRZ data signals which have passed through flip-flop 15. Both the pulses at the output of flip-flop 15 and the delayed pulses at the output of flip-flop 16 are applied to the inputs of exclusive OR circuits 17. The result is that the output signal state of exclusive OR gate 17 is high for different input signal states, and low for similar input signal states. The remaining gates 18–23 generate and time the control signal inputs to flip-flops 24 and 25 which generate the control signals for multiplexer 26.

The output of exclusive OR circuit 29 is connected to the input of a bandpass filter 33, which is designed to generate a cosine function in a manner known to persons skilled in the art. The output signal of filter 33 is applied to input $y_2$ through ac coupled operational amplifier circuit 34. The output of bandpass filter 33 is also inverted in inverting amplifier 35, the output of which is connected to input $y_3$ of multiplexer 26.

The output of exclusive OR circuit 29 is a clock pulse which has a rate ½ of the input clock pulse rate. The signals are applied to bandpass amplifier 33, where it is converted to cosine form. Thus this signal is a double interval (of the clock pulse, or NRZ data) cosine signal. This signal is applied through amplifier 34 to input $y_2$ of multiplexer 26.

The double interval cosine form is also inverted in inverting amplifier 35 and is applied to input $y_3$ of multiplexer 26.

The remainder of the circuit is shown in FIG. 4(B). The input clock signal is inverted in inverter 36, and is applied to the input of monostable multivibrator 37, which is a time delay compensation circuit. The output of monostable multivibrator 37 is connected to the input of bandpass filter 38, which operates as a cosine function signal generator of single interval corresponding to the clock pulse or NRZ data pulse. The output of bandpass filter 38 is connected to the input of amplifier 39, which has an amplification factor A which is preferably controllable. The output signal of amplifier 39 is applied to an inverter 40. The output of inverter 40 is applied through a coupling capacitor 41 to an input $y_4$ of multiplexer 26, after being negatively DC biased (i.e. raising the cosine function negatively) by the voltage divider consisting of resistors 42 and 43 connected at their junction to input $y_4$, the other terminal of one resistor being connected to ground and the other terminal of the other resistor being connected to a source of negative potential, e.g. −5 VDC.

The output of amplifier 39 is also connected through buffer 44, and via capacitor 45 to input $y_1$ of multiplexer 26. Input $y_1$ is positively DC biased (i.e. raising the cosine function positively), being connected to the junction of a pair of resistors 46 and 47 which are connected in series between ground and a source of positive potential, e.g. +5 VDC. The degree of bias on inputs $y_4$ and $y_1$ can be adjusted by making resistors 43 and 46 potentiometers.

Gates 19–23 detect whether the first and second bits of each pair of bits of the NRZ data are the same or are different, and whether they are positive or negative, and apply resulting control signals to flip-flops 25 and 24, for application to multiplexer 26.

The clock signal, applied to the clock inputs of flip-flops 15 and 16 synchronize the NRZ data with the clock, and also synchronize flip-flops 24 and 25 with the clock after being delayed in multivibrator 31 sufficient to compensate for the gate delays of the NRZ data. The resulting output signals from flip-flops 24 and 25 synchronized to the clock, are the control signals applied to four channel multiplexer 26.

The clock signal is also divided by two to create double interval clock signals after passing through flip-flop 28 and exclusive OR gate 29, and is applied to bandpass filter 33. Bandpass filter 33 converts the double interval square wave pulse signals to double interval cosine form signals. The signals are passed through operational amplifier 34 and are applied to input $y_2$ of multiplexer 1. This input corresponds to the similarly labelled input referred to in FIG. 1.

The cosine form of signal is also passed through inverting amplifier 35, where it is inverted, and the resulting signals are applied to input $y_3$ of multiplexer 26. This input corresponds to $y_3$ referred to in the block diagram of FIG. 1. The form of the signal appearing at input $y_3$ is $\cos(\pi t/T)$, while the form of the signal appearing at input $y_2$ is $-\cos(\pi t/T)$.

The clock signal also is applied to two-stage multivibrator 37, from which it is applied to bandpass filter 38, which generates a cosine function signal from the clock signal. This signal is applied to the input of amplifier 39, having the function A. The function A is based on the amplification factor of amplifier 39.

The resulting signal is passed through inverter 40, and is negatively DC biased to raise the cosine negatively by the resistor network comprised of series resistors 42 and 43 as described earlier, and is then applied to input $y_4$ of multiplexer 26. It should be noted that inverter 40 changes the positive cosine function at the output of amplifier 39 to a negative cosine function.

The positive cosine function at the output of amplifier 39 is passed through buffer 44 and after being positively DC biased (raised) by series resistors 46 and 47 is applied to the $y_1$ input of multiplexer 26.

It may thus be seen that the signal at input $y_4$ at multiplexer 26 is of the form $A+(1-A)\cos(2\pi t/T)$, while the signal at input $y_1$ is the inverse of this, i.e. $-A-(1-A)\cos(2\pi t/T)$.

Now depending on the states of the logic control signals at inputs C—C of the multiplexer 26, one of the generated functions at inputs $y_1$–$y_4$ is switched to output lead 48 of multiplexer 46, and is applied to a final output amplifier stage 49. The sequence by which the signals are switched is described earlier with reference to the block diagram of FIG. 1.

Alternative structures by which the processed baseband signal could be produced as shown in FIG. 2 include double-pulse interval pulse overlapping (i.e. superposed quadrature amplitude modulated pulses, or binary transversal filtering). FIG. 5 illustrates the production of an output waveform $y(t)$ as a result of overlapping of two superposed quadrature amplitude modulated pulses $s(t)$ in accordance with the NRZ pulse transition directions $a_0$–$a_3$, as an example.

FIGS. 6A and 6B are graphs illustrating quadrature-offset modulation system ("offset" implies half a symbol or one bit offset in the quadrature channel) performance degradation as a function of the amplitude parameter A for a linear channel (in FIG. 6A) and for a nonlinear channel (in FIG. 6B), in comparison with MSK and TFM systems (the graph showing the present invention being referenced SQAM). The present invention clearly shows substantially improved (less) degradation.

FIG. 7 is a graph illustrating a comparison of degradation of the present invention, line reference SQAM, having the parameter A=0.85 with MSK, IJF-OQPSK and OQPSK systems, in a single channel environment. The graph shows $E_b/N_o$ degradation vs channel spacing for hard limited multichannel systems with two equal power ACIs. The degradation is compared to $E_b/N_o$=8.4 dB at $P_e = 1 \times 10^{-4}$. Clearly the present invention depicted by line SQAM shows lower degradation at all but the narrowest channel spacing.

FIG. 8 is a graph illustrating $E_b/N_o$ degradation vs fade depth of the desired channel for hard limited multichannel systems, in which the channel spacing equals 100 MHz, for a bit rate of 120 Mb/s. The graph compares the kinds of systems referred to earlier with the present SQAM system in which A=0.85. Clearly the present invention shows substantially reduced degradation in a fading multichannel environment. Evidently similar conclusions apply to medium and low rate systems including 2.4 Kb/s rate mobile radio channels.

The present invention thus provides also mobile radio channels substantially improved signal processor with improved power spectrum and envelope fluctuation of quadrature amplitude modulated signals, thus improving system efficiency. It is believed that the use of this technique may allow up to a 50% reduction of the transmit radio antenna diameter, as one of its resulting advantages. This advantage can be concluded from FIG. 8 from which it can be seen for example that a 12 db fade depth suffers about 2 db degradation while OQPSK and MSK suffer about 7 db degradation.

Clearly the signal processor described herein can be used as a filter whereby the NRZ input signal is converted to a signal which can be amplified by a non-linear, saturated, high-power amplifier, with minimum sidebands, controlled bandwidth of the main spectral lobe, and controlled side lobe roll-off. It can also be used to provide the signal input to a modulator, and can as well be used in baseband systems such as conventional DSB modulators, quadrature QPSK, QAM (single and multichannel systems) and SSB/USB systems.

FIG. 9 shows in block diagram a modulator consisting of two baseband signal processors of the kind described herein, in a conventional offset-QAM modulator structure. The NRZ data is applied to a signal splitter 49, which applies the signal to a baseband signal processor 51A of the kind described herein, and to a 1 bit time delay circuit 50. The output of time delay circuit 50 is connected to the input of a baseband signal processor 51B of the kind described herein.

The outputs of processors 51A and 51B are connected to modulators 52A and 52B respectively, to which a carrier is applied, the carrier being applied to modulator 52A unshifted, but being applied to modulator 52B shifted by 90° in phase shifter 53. The outputs of modulators 52A and 52B are applied to summer 54 where they are summed, to provide an output signal on transmission path 55.

The above circuit forms a superposed quadrature amplitude modulated modulator consisting of two baseband signal processors of the kind described herein in a conventional offset-QAM modulator structure. For this modulator it has been found that no additional spectral shaping filters are required. The demodulator which would be utilized is the same as an offset-QAM (or OQPSK) demodulator.

A person understanding this invention may now conceive of various alternatives, structures, or variations in the present described preferred embodiment. All are considered to be within the scope and sphere of this invention as defined in the claims appended hereto.

We claim:
1. A signal processor comprising:
   (a) means for converting an NRZ input signal to a double interval raised cosine pulse having a peak amplitude normalized to 1.0,
   (b) means for superposing another weighted single interval raised cosine pulse having a peak amplitude $(A-1)$ with the former raised cosine pulse to provide a continuous output signal, of a form related to the NRZ input signal,
   in which the converting and superposing means are comprised of:
   (i) means for detecting the binary values of each pair of consecutive bits of the NRZ input signal;
   (ii) means for generating an output signal having the function $Y_1 = -A(1-A) \cos(2\pi t/T)$ if the pair of bits are $-1, -1$;
   (iii) means for generating an output signal having the function $Y_2 = -\cos(\pi t/T)$ if the pair of bits are $1, -1$;
   (iv) means for generating an output signal having the function $Y_3 = \cos(\pi t/T)$ if the pair of bits are $-1, 1$ and
   (v) means for generating an output signal having the function $Y_4 = A + (1-A)\cos(2\pi t/T)$ if the pair of bits are $1,1$,
   where T is the NRZ input signal symbol duration, and A is the amplitude parameter of the processor, the output signals being continuous.
2. A signal processor as defined in claim 1 in which the converting and superposing means is comprised of means for overlapping shaped pulses to form the said output signal functions.
3. A signal processor as defined in claim 1 constituting a filter.
4. A signal processor as defined in claim 1 for providing a signal to a modulator.
5. A signal process for a modulator comprising:
   (a) means for detecting the binary values of each pair of consecutive bits of an NRZ input signal,
   (b) means for generating signals having waveshapes according to the functions $y_1 = -A - (1-A)\cos(2\pi t/T)$, $y_2 = -\cos(\pi t/T)$, $y_3 = \cos(\pi t/T)$ and $y_4 = A + (1-A)\cos(2t/T)$, where T is the input signal symbol duration, and A is an amplitude parameter,
   (c) means for switching said $y_1$, $y_2$, $y_3$ and $y_4$ signals to an output transmission path to form a continuous signal according to the following table:

| 1st NRZ bit | Following NRZ bit | Output Signal |
|---|---|---|
| −1 | −1 | $y_1$ |
| 1 | −1 | $y_2$ |
| −1 | 1 | $y_3$ |
| 1 | 1 | $y_4$ |

6. A signal processor as defined in claim 5, including a four channel multiplexer, means for applying said signals $y_1$, $y_2$, $y_3$ and $y_4$ to separate signal inputs of the multiplexer, means for generating control signals from the detected binary values of the pairs of consecutive bits, and for applying the control signals to control inputs of the multiplexer to cause the multiplexer to switch any of the signals at its separate signal inputs to be connected to its output transmission path according to said table.

7. A processor as defined in claim 6, in which the signal generating means is comprised of a pair of cosine function generators, the output of one of said generators being connected through an amplifier having amplification factor A, the outputs of the second of said generators and of the amplifier providing signals having the functions $y_2$ and $y_1$ respectively, and the outputs of said second generator and of the amplifier being connected through inverters to provide signals having the functions $y_3$ and $y_4$ respectively.

8. A processor as defined in claim 6, including a source of clock pulses having the same bit rate as the NRZ input signal, the generating means being formed of a pair of bandpass filters for translating the clock pulses into cosine functions, the output of one of said bandpass filters being connected through an amplifier having amplification factor A, the outputs of the second of said bandpass filters and of the amplifier providing signals having the functions $y_2$ and $y_1$ respectively, and the outputs of said second bandpass filter and of the amplifier being connected through inverters to provide signals having the functions $y_3$ and $y_4$ respectively.

9. A processor as defined in claim 6 in which the parameter A is adjustable to control the bandwidth of the main spectral lobe and the side lobe roll-off characteristics of the signal on the output transmission path.

10. A processor as defined in claim 9, in which the signal generating means is comprised of a pair of cosine function generators, the output of one of said generators being connected through an amplifier having amplification factor A, the outputs of the second of said generators and of the amplifier providing signals having the functions $y_2$ and $y_1$ respectively, and the outputs of said second generator and of the amplifier being connected through inverters to provide signals having the functions $y_3$ and $y_4$ respectively.

11. A processor as defined in claim 9, including a source of clock pulses having the same bit rate as the NRZ input signal, the generating means being formed of a pair of bandpass filters for translating the clock pulses into cosine functions, the output of one of said bandpass filters being connected through an amplifier having amplification factor A, the outputs of the second of said bandpass filters and of the amplifier providing signals having the functions $y_2$ and $y_1$ respectively, and the outputs of said second bandpass filter and of the amplifier being connected through inverters to provide signals having the functions $y_3$ and $y_4$ respectively.

12. A processor as defined in claim 5, in which the signal generating means is comprised of a pair of cosine function generators, the output of one of said generators being connected through an amplifier having amplification factor A, the outputs of the second of said generators and of the amplifier providing signals having the functions $y_2$ and $y_1$ respectively, and the outputs of said second generator and of the amplifier being connected through inverters to provide signals having the functions $y_3$ and $y_4$ respectively.

13. A processor as defined in claim 5, including a source of clock pulses having the same bit rate as the NRZ input signal, the generating means being formed of a pair of bandpass filters for translating the clock pulses into cosine functions, the output of one of said bandpass filters being connected through an amplifier having amplification factor A, the outputs of the second of said bandpass filters and of the amplifier providing signals having the functions $y_2$ and $y_1$ respectively, and the outputs of said second bandpass filter and of the amplifier being connected through inverters to provide signals having the functions $y_3$ and $y_4$ respectively.

14. A signal processor as defined in claim 5 constituting a filter.

15. A signal process or as defined in claim 5 for providing a signal to a modulator.

16. A modulator comprising:
  (a) a pair of signal processors as defined in claim 5,
  (b) a source of NRZ data signals,
  (c) means for applying the data signals to one of the signal processors,
  (d) means for delaying the data signals by one bit period and applying the delayed data signals to the other signal processor,
  (e) means for combining an output signal from the first signal processor with a carrier signal,
  (f) means for combining an output signal from the other signal processor with the carrier signal shifted 90°,
  (g) means for summing the combined output signals to provide a modulated output signal.

17. A signal processor comprising:
  (a) means for detecting the binary values of each pair of consecutive bits of a digital signal,
  (b) means for generating a continuous output signal having a waveshape dependent on the binary values of each pair of said bits,
  in which said continuous output signal is formed of waveshapes according to the functions $Y_1 = -A-(1-A) \cos(2\pi t/T)$, $Y_2 = -\cos(\pi t/T)$, $Y_3 = \cos(\pi t/T)$ and $Y_4 = A+(1-A)\cos(2\pi t/T)$ where T is the input signal symbol duration, and A is an amplitude parameter, which follow in smooth sequence according to the following table:

| 1st NRZ bit | Following NRZ bit | Output Signal |
| --- | --- | --- |
| −1 | −1 | $Y_1$ |
| 1 | −1 | $Y_2$ |
| −1 | 1 | $Y_3$ |
| 1 | 1 | $Y_4$ |

18. A signal processor as defined in claim 17 in which the generating means is comprised of means for overlapping shaped pulses to form the said output signal.

19. A signal processor as defined in claim 17 constituting a filter.

20. A signal processor as defined in claim 17 for providing a signal to a modulator.

* * * * *